US008485301B2

(12) United States Patent
Grubaugh et al.

(10) Patent No.: US 8,485,301 B2
(45) Date of Patent: Jul. 16, 2013

(54) OPERATOR MONITORING SYSTEM FOR A VEHICLE

(75) Inventors: James Grubaugh, Richmond, IN (US); Christopher Donald Rood, Greenfield, IN (US); Cory Dean Roberson, Knightstown, IN (US); James John Zimnicki, Richmond, IN (US)

(73) Assignee: Shem, LLC, Hagerstown, IN (US)

( * ) Notice: Subject to any disclaimer, the term of this patent is extended or adjusted under 35 U.S.C. 154(b) by 25 days.

(21) Appl. No.: 13/161,208

(22) Filed: Jun. 15, 2011

(65) Prior Publication Data
US 2012/0018240 A1    Jan. 26, 2012

Related U.S. Application Data

(60) Provisional application No. 61/355,012, filed on Jun. 15, 2010.

(51) Int. Cl.
*B60T 7/12* (2006.01)

(52) U.S. Cl.
USPC ............................................ 180/273; 701/45

(58) Field of Classification Search
USPC .................... 180/272, 273, 271; 701/70, 45
See application file for complete search history.

(56) References Cited

U.S. PATENT DOCUMENTS

| | | | |
|---|---|---|---|
| 3,866,723 A * | 2/1975 | Smith ............................ 188/109 |
| 4,136,752 A * | 1/1979 | Friesen et al. ................. 180/273 |
| 4,664,218 A | 5/1987 | Graham et al. |
| 4,892,014 A * | 1/1990 | Morell et al. ..................... 477/92 |
| 5,377,777 A * | 1/1995 | Moore et al. ..................... 180/272 |
| 5,706,909 A * | 1/1998 | Bevins et al. .................... 180/273 |
| 6,135,230 A * | 10/2000 | Schenck et al. ................. 180/273 |
| 6,450,587 B1 * | 9/2002 | MacGregor et al. ............. 303/89 |
| 6,685,281 B2 * | 2/2004 | MacGregor et al. .......... 303/123 |
| 7,121,608 B2 * | 10/2006 | Billger et al. ............... 296/65.06 |
| 7,225,067 B2 * | 5/2007 | Sleboda et al. .................. 701/36 |
| 7,259,662 B2 * | 8/2007 | Lewis ............................ 340/439 |
| 7,317,392 B2 * | 1/2008 | DuRocher ..................... 340/562 |
| 7,347,299 B2 * | 3/2008 | Billger et al. .................. 180/326 |
| 7,445,078 B2 | 11/2008 | Dolesh et al. |
| 7,469,594 B2 * | 12/2008 | Jitsui et al. ...................... 73/779 |
| 7,681,963 B2 * | 3/2010 | Sherman et al. ............... 303/189 |
| 7,899,597 B2 * | 3/2011 | Vitale et al. ..................... 701/50 |
| 8,122,695 B2 * | 2/2012 | Suhara ............................ 56/202 |
| 2003/0196495 A1 * | 10/2003 | Saunders et al. .......... 73/862.041 |
| 2004/0124697 A1 * | 7/2004 | MacGregor et al. ............. 303/89 |
| 2004/0251071 A1 * | 12/2004 | Yu et al. ......................... 180/272 |
| 2006/0151227 A1 * | 7/2006 | Reith ............................. 180/273 |
| 2007/0010927 A1 * | 1/2007 | Rowley et al. ................... 701/51 |
| 2009/0160245 A1 | 6/2009 | Accardi |
| 2010/0283300 A1 * | 11/2010 | Gryp et al. ..................... 297/340 |

\* cited by examiner

*Primary Examiner* — Paul N Dickson
*Assistant Examiner* — Timothy Wilhelm
(74) *Attorney, Agent, or Firm* — Banner & Witcoff, Ltd.

(57) ABSTRACT

A vehicle has an operator monitoring system that includes an operator sensor configured to sense whether the operator is in a proper operating position within the operator cab and a control module connected to the operator sensor wherein when the vehicle is running and the operator sensor senses that the operator is not in the proper operating position, the control module activates safety features to stop the truck, including any one or a combination of activating the main brake, activating the parking brake, and/or shifting the transmission to a different setting.

26 Claims, 14 Drawing Sheets

OPERATOR MONITORING SYSTEM FOR A VEHICLE

CROSS-REFERENCE TO RELATED APPLICATION

The present application claims the benefit of and is a continuation-in-part application of U.S. Patent Appln. No. 61/355,012, filed on Jun. 15, 2010, which application is incorporated by reference in its entirety and made a part hereof.

TECHNICAL FIELD

The present invention generally relates to an operator monitoring system for a vehicle and more particularly to a system that monitors movement and/or presence of an operator in a truck cab during operation of a refuse truck or other vehicle to assist in proper operation of the truck.

BACKGROUND

Vehicles such as heavy-duty trucks are well known in the art. Such heavy-duty trucks may take various forms and in one example may be in the form of a refuse hauling truck. The typical refuse hauling truck has a chassis supporting an operator cab and a body section that receives refuse from dumpsters, totes or garbage receptacles being emptied into the body section, such as via articulating members associated with the body section. The operator cab of the refuse truck may be designed to include a right-side drive configuration wherein an operator can drive the refuse truck from the right or curb side of the operator cab in a standing configuration. This right-side drive configuration is often used when the operator proceeds along a residential route to empty refuse into the truck. As such, the operator is frequently driving to a location on the route, stopping the truck and exiting the truck to empty refuse from the dumpsters, totes or garbage receptacles into the truck. The operator returns to the operator cab and drives a short distance to the next location and repeats the process. Because of the repetitive start/stop nature in emptying refuse into the truck along the route, there exists a chance where the operator may exit the operator cab before the refuse truck has come to a complete stop, leaving a moving truck without an operator. This may result in injury or damage to persons or property.

Thus, while certain refuse hauling trucks and other vehicles according to existing designs provide a number of advantageous features, they nevertheless have certain limitations. The present invention seeks to overcome certain of these limitations and other drawbacks of the prior art, and to provide new features not heretofore available.

BRIEF SUMMARY

Aspects of the invention relate to a refuse truck or other vehicle that includes a chassis that supports a truck body and an operator cab and is connected to a plurality of wheels, a main brake, a parking brake, a transmission, and an operator monitoring system. The main brake is operably connected to at least one of the wheels, and the parking brake is also operably connected to at least one of the wheels. The transmission is operably connected to transfer power to at least one of the wheels. The operator monitoring system includes an operator sensor configured to sense whether the operator is in a proper operating position within the operator cab, and a control module connected to the operator sensor and further connected to at least one of the main brake, the parking brake, and the transmission. When the truck is running and the operator sensor senses that the operator is not in the proper operating position, the control module is configured to activate safety features to stop the truck, including activating the main brake, activating the parking brake, and/or shifting the transmission to a different setting, or any combination thereof. The safety features may include all of these actions, as well as other additional or alternate actions.

According to one aspect, the operator sensor is or includes a weight-sensitive or pressure-sensitive mat, an optical or laser sensor, an optical or light source on the vest of the operator and associated sensor, an RFID tag or bracelet worn by the driver and associated sensor, a releasable tether cord, a seat belt buckle indicator, an indicator of whether a door of the operator cab is open, or any combination thereof.

According to another aspect, the operator sensor includes a weight-sensitive or pressure-sensitive mat that has a sensor circuit comprising a pair of contacts separated by a force-reactive separation material, wherein upon application of weight or pressure to the contacts by the presence of the operator, the separation material compresses and permits the contacts to establish an electrical connection to detect the presence of the operator.

According to a further aspect, the control module may activate the safety features only if the parking brake is not engaged and/or only if the speed of the vehicle is within a threshold range, such as less than 10 mph or between 0 and 10 mph.

According to an additional aspect, the operator cab has a left steering wheel and a right steering wheel, and the truck is adjustable between a left hand drive configuration and a right hand drive configuration. In this configuration, the control module activates the safety features only if the truck is in the right hand drive configuration.

According to yet another aspect, the operator monitoring system includes an electronic counter in communication with the control module, where the electronic counter records a count and advances the count by one each time the control module activates safety features to stop the truck.

According to a still further aspect, the operator monitoring system includes a first switch configured to be activated when the ignition of the truck is activated and the truck is in a right-hand drive configuration, a second switch configured to be activated when a speed of the truck is within a threshold range, a third switch configured to be activated when the operator sensor senses that the operator is not in the proper operating position, and a fourth switch configured to be activated when the parking brake is not engaged. The system further includes an activation switch within the control module that is configured to activate the safety features when the first, second, third, and fourth switches are all activated.

According to another aspect, the vehicle also includes a pneumatic system having a solenoid connected to the operator monitoring system, where activation of the safety features energizes the solenoid to pneumatically activate at least one of the main brake and the parking brake. In one embodiment, the pneumatic system activates both the main brake and the parking brake, and the pneumatic system includes a narrowed orifice fitting downstream from the main brake. The orifice fitting delays the activation of the parking brake until at least 0.75 seconds after activation of the main brake.

Additional aspects of the invention relate to an operator monitoring system for use with a vehicle configured for operation by an operator in a standing position. The system includes an operator sensor configured to sense whether the operator is in a proper operating position within the operator cab, and a control module connected to the operator sensor and configured for connection to a brake of the vehicle. The operator sensor includes a floor mat configured to be placed on a floor of the vehicle and having a force sensor configured to sense the presence of the operator standing on the floor mat. When the operator sensor senses that the operator is not in the proper operating position, the control module is configured to activate safety features to stop the truck, the safety features including transmitting a signal configured to activate a brake of the vehicle to stop the vehicle.

According to one aspect, the control module further includes inputs configured for detecting speed of the vehicle and engagement of a parking brake. The control module activates the safety features if the speed of the vehicle is within a threshold speed range and the parking brake is not engaged.

According to another aspect, the control module activates the safety features to stop the truck by transmitting at least one signal to activate a second brake of the vehicle and to shift a transmission of the vehicle to neutral.

Further aspects of the invention relate to a vehicle that includes a chassis supporting a body and an operator cab and being connected to a plurality of wheels, a first brake operably connected to at least one of the wheels, and an operator monitoring system. The operator cab has a standing area for the operator to operate the vehicle in a standing position. The operator monitoring system includes an operator sensor configured to sense whether the operator is in a proper standing operating position within the standing area of the operator cab and a control module connected to the operator sensor and further connected to the first brake. When the vehicle is running and the operator sensor senses that the operator is not in the proper standing operating position, the control module is configured to activate safety features to stop the truck, including activating the first brake.

According to one aspect, the operator cab has a left operator area having a seat for the operator to operate the vehicle in a left-hand drive configuration and a right operator area having the standing area for the operator to operate the vehicle in a standing right-hand drive configuration, and the vehicle has a selector for selecting between the left-hand drive configuration and the standing right-hand drive configuration. The control module is configured to activate the safety features only when the standing right-hand drive configuration is selected.

According to another aspect, the control module further includes inputs configured for detecting speed of the vehicle and engagement of the first brake, and the control module activates the safety features if the speed of the vehicle is within a threshold speed range and the first brake is not engaged.

According to a further aspect, the vehicle also includes a second brake operably connected to at least one of the wheels and a transmission operably connected to transfer power to at least one of the wheels. The safety features may further include activating the second brake and/or shifting the transmission to neutral.

According to yet another aspect, the operator sensor includes a mat sitting on a floor of the standing area in the operator cab and having a force sensor configured to sense the presence of the operator standing on the mat.

Still further aspects of the invention relate to a refuse truck or other vehicle that includes a chassis supporting a truck body and an operator cab and being connected to a plurality of wheels, a main brake and a parking brake each operably connected to at least one of the wheels, a transmission operably connected to transfer power to at least one of the wheels, and an operator monitoring system. The operator cab has a left operator area having a seat for the operator to operate the vehicle in a left-hand drive configuration and a right operator area having a standing area for the operator to operate the vehicle in a standing right-hand drive configuration, and the truck also includes a selector for selecting between the left-hand drive configuration and the standing right-hand drive configuration. The operator monitoring system includes an operator sensor configured to sense whether the operator is in a proper standing operating position within the standing area of the right operator area of the operator cab and a control module connected to the operator sensor and further connected to the main brake, the parking brake, and the transmission. When the truck is running in the standing right-hand drive configuration and the operator sensor senses that the operator is not in the proper standing operating position, the control module is configured to activate safety features to stop the truck. The safety features include activating the main brake, activating the parking brake, shifting the transmission to a different setting. The operator monitoring system further includes a delay apparatus configured to delay the activation of the parking brake until a predetermined time after activation of the main brake.

According to one aspect, the truck includes a pneumatic system connected to the main brake and the parking brake. The pneumatic system has a solenoid connected to the operator monitoring system, where activation of the safety features energizes the solenoid to pneumatically activate the main brake and the parking brake. The delay apparatus delays a pneumatic signal from reaching the parking brake after activation of the main brake. The delay apparatus may be a narrowed orifice located on a pneumatic line between the main brake and the parking brake.

According to another aspect, the operator sensor includes a sensor circuit with a pair of contacts separated by a force-reactive separation material. Upon application of weight or pressure to the contacts by the presence of the operator, the separation material compresses and permits the contacts to establish an electrical connection to detect the presence of the operator.

According to another aspect, the operator monitoring system further includes a resistor located at a connection between the operator sensor and the control module. The resistor is configured to permit detection of a fault in the operator sensor.

BRIEF DESCRIPTION OF THE DRAWINGS

To understand the present invention, it will now be described by way of example, with reference to the accompanying drawings in which.

DETAILED DESCRIPTION

Figure 1:
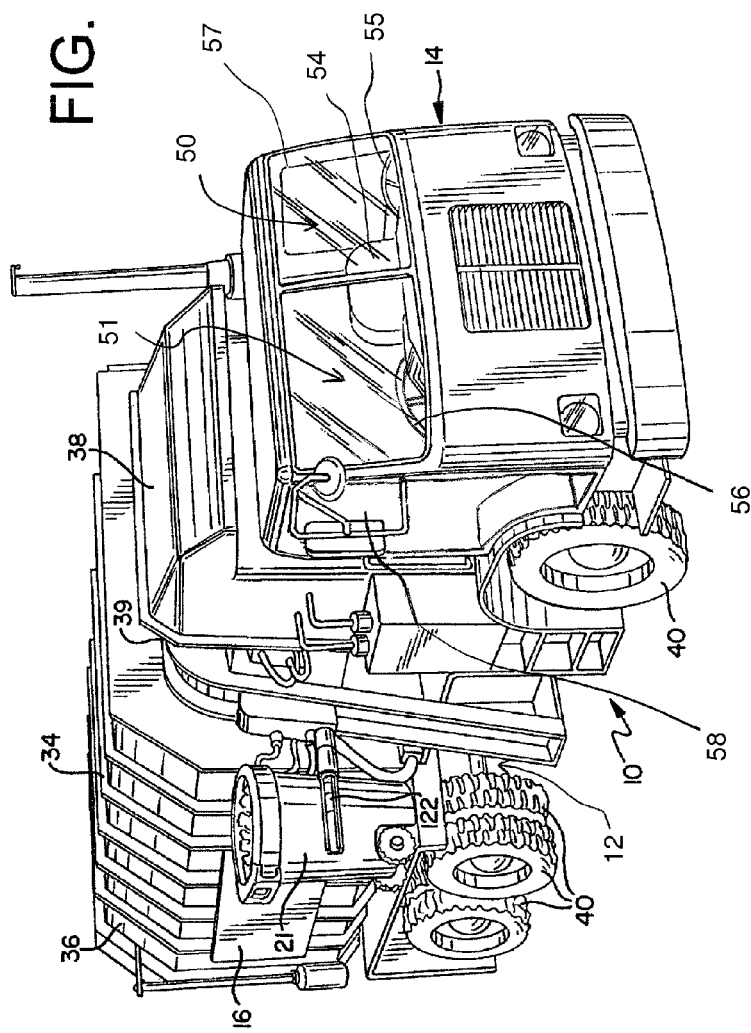
FIG. 1 is a perspective view of a vehicle according to one embodiment of the present invention in the form of a refuse truck.

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

Referring now in detail to the Figures, FIG. 1 discloses a vehicle of the present invention, generally designated with the reference numeral 10. In one embodiment, the vehicle is in the form of a refuse hauling truck. It is understood that aspects and features of the present invention can be incorporated into various types of vehicles including other heavy-duty vehicles, medium-duty vehicles or light-weight vehicles of various applications.

Figure 2:
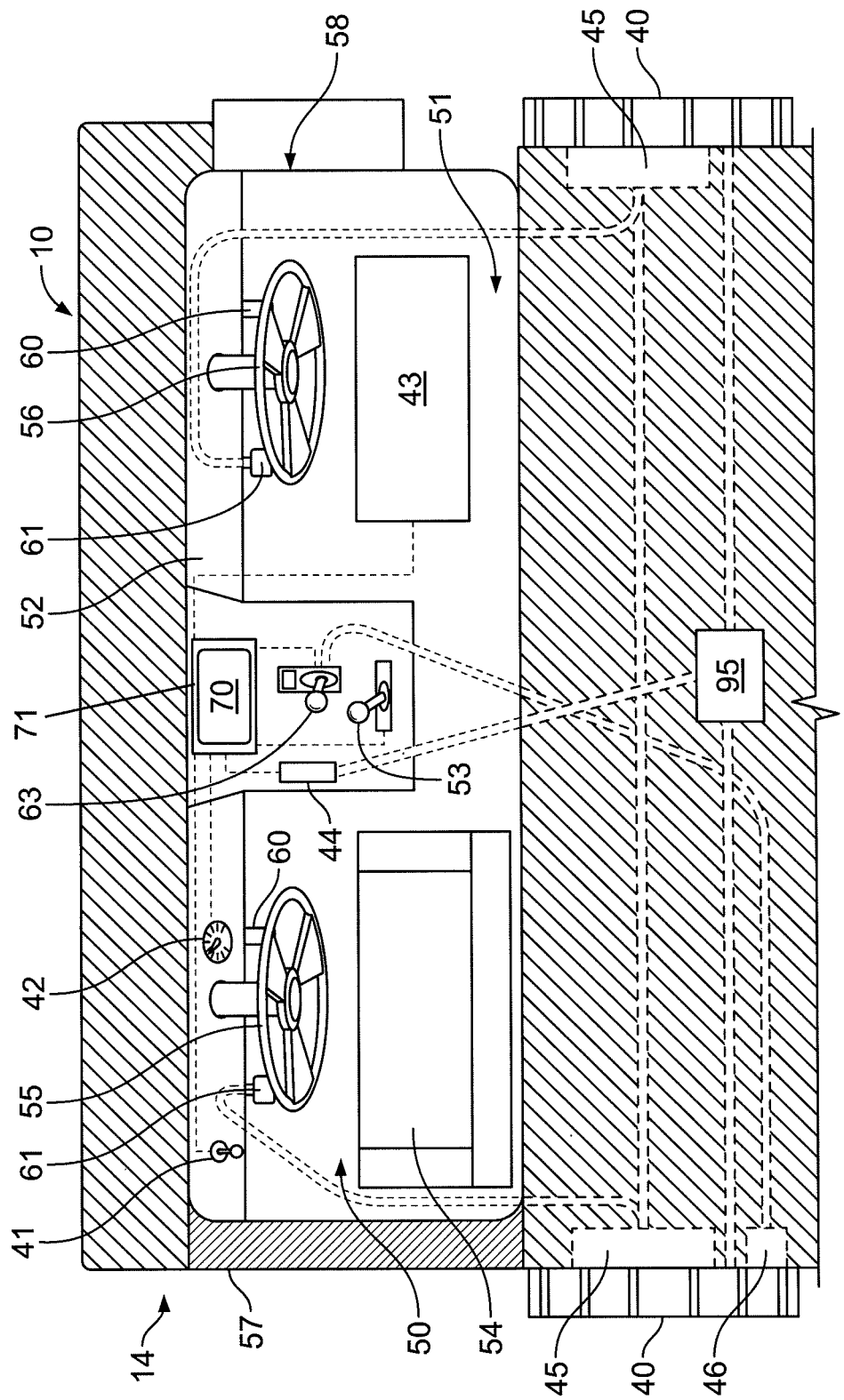
FIG. 2 is a top view of an inside of an operator cab of a vehicle according to one embodiment of the present invention.

The truck 10 generally includes a chassis 12 supporting an operator cab 14 and a vehicle body 16. When assembled, the body 16 and the operator cab 14 are mounted on the chassis 12. The chassis 12 is a truck chassis and may have generally rectangular steel frame members or rail members. As is known in the art, the chassis 12 has a front axle and a rear axle (not shown) which in turn are attached to wheels 40 for movement of the chassis along a surface. Additionally, as shown in FIG. 2, the vehicle 10 includes a drivetrain that includes a transmission 95 configured to transfer power to at least one of the wheels 40. FIG. 2 illustrates the transmission 95 connected to both front wheels 40, but it is understood that the transmission 95 may be connected to transfer power directly to any number of the wheels 40, including, additionally or alternately, one or more of the back wheels 40 in some embodiments. It is understood that the transmission may allow shifting between several settings (e.g. D, N, R) and several gears (e.g. various forward-drive gear ratios).

The chassis 12 may receive several different configurations of the body 16. As illustrated in FIG. 1, in an exemplary embodiment for a refuse truck, the body 16 includes a storage area 34, a loading area (not shown), a reception area 38, an open hopper 39 and an articulating arm 122. Refuse 21 may be loaded in the reception area 38 by use of the articulating arm 122. Refuse is stored in the storage area 34 and generally compacted within the body 16. However, as understood by those of skill in the art, other bodies for different purposes such as front loaders, rear loaders, dump trucks, straight trucks, cement trucks, pumpers, sweepers and other applications may be used in connection with the present invention. Numerous components of the body 16 are capable of being adjusted, manipulated or otherwise actuated such as lifting the axles, manipulating the articulating arm 122, opening the hopper 39, and compacting.

The operator cab 14 generally includes a left operator area 50 and a right operator area 51, and may also contain a dashboard 52 that includes controls for operating and monitoring the vehicle 10, such as in the embodiment of the operator cab 14 is illustrated in FIGS. 1 and 2. The left operator area 50 has a seat 54 for the operator to sit and a left steering wheel 55, as well as an accelerator 60 and a brake 61, for operating the vehicle 10 in a left hand drive configuration. The right operator area 51 has a right steering wheel 56, as well as an accelerator 60 and a brake actuator 61, for operating the vehicle 10 in a right hand drive configuration, and provides a standing area for the operator to stand, such as while driving short distances between stops to load refuse. The standing area may include sufficient width and height for the operator to stand while operating the vehicle 10. In this embodiment, the left operator area 50 has a swinging door 57 that closes to secure the operator in the cab 14, and the right operator area 51 has an opening 58 with a lockable or stowable door (not shown) that can be opened and locked into an open and/or stowed position, to allow the operator easy ingress and egress without the need to repeatedly open and shut the door. In one embodiment, the stowable door is a swinging door that can be locked in a stowed position where it does not obstruct the opening 58. In another embodiment, the right operator area 51 may also have a door of some type. The vehicle 10 is switchable between the left hand drive configuration and the right hand drive configuration, such as by a mode control 53. In another embodiment, the vehicle 10 may be switchable in another manner, or may not have any switching mechanism. It is understood that the features of the left operator area 50 and the right operator area 51 may be mixed or interchanged. For example, the right operator area 51 may also include a seat 54 and/or a door 57, or the features of the left and right operator areas 50, 51 may be switched, such as for use in a jurisdiction such as the UK, where vehicles operate on the left hand side of a roadway.

The cab 14 may also include at least one ignition switch 41, at least one speedometer 42, and at least one transmission control 44 (e.g. a stick or a push-button control), which may be located in the dashboard 52. The transmission control 44 is configured to control the transmission 95 of the vehicle 10 to shift between a plurality of different settings, which may include forward and reverse gears, a neutral gear or setting, and optionally other gears or settings, such as a "park" setting. In one embodiment, the transmission 95 may include auto-neutral features. The vehicle 10 has a main or service braking system 45, which may be air brakes in one embodiment, operated by brake actuators 61, shown in the form of a pedal brake in FIG. 2. The vehicle 10 may also include a parking brake system 46, which may be a mechanical brake, operated by a parking brake actuator 63. The cab 14 may have one or multiple parking brake actuators 63 that are accessible from different spots in the cab 14. The cab 14 may have further controls for the vehicle 10, as is known in the art, such as controls for lifting the axles, manipulating the articulating arm 122, opening the hopper 39, compacting, etc.

Figure 6:
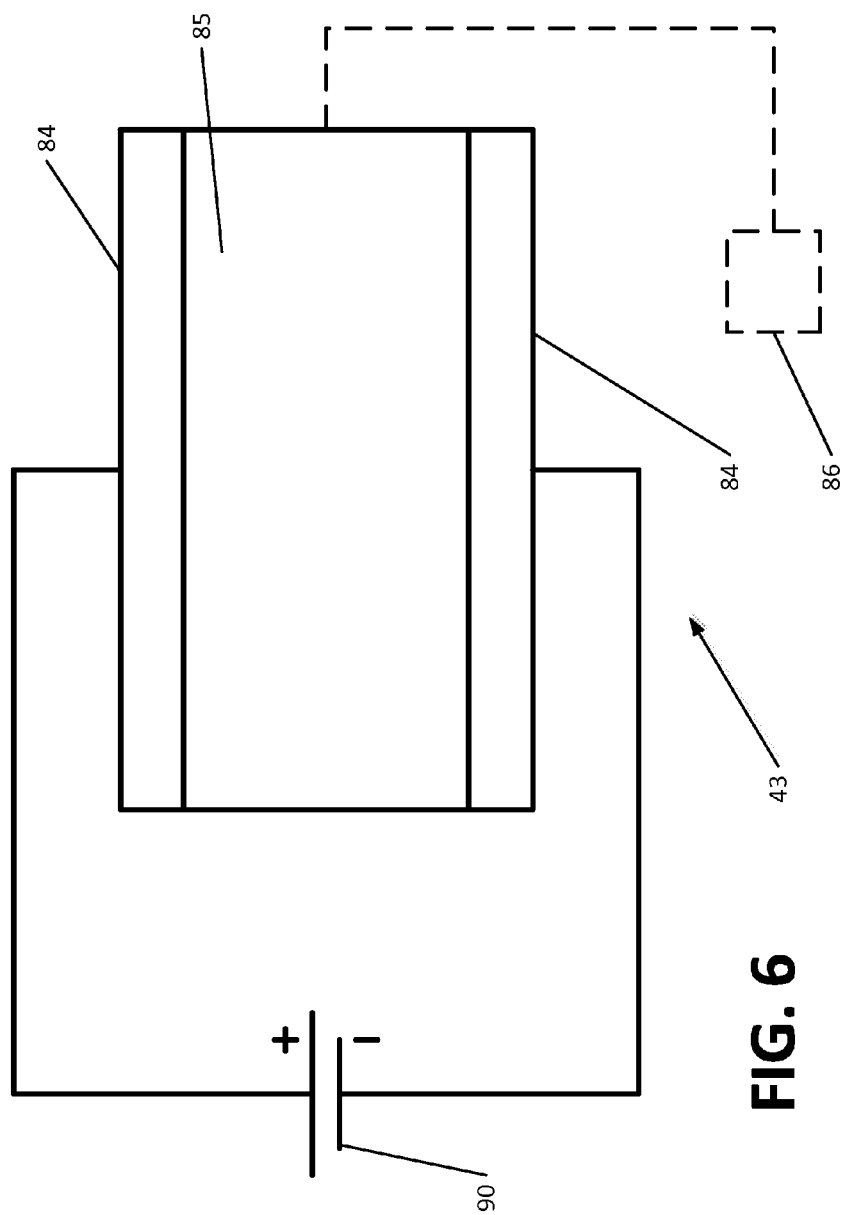
FIG. 6 is a schematic diagram of a portion of a sensor of the operator monitoring system of FIG. 3.
Figure 7:
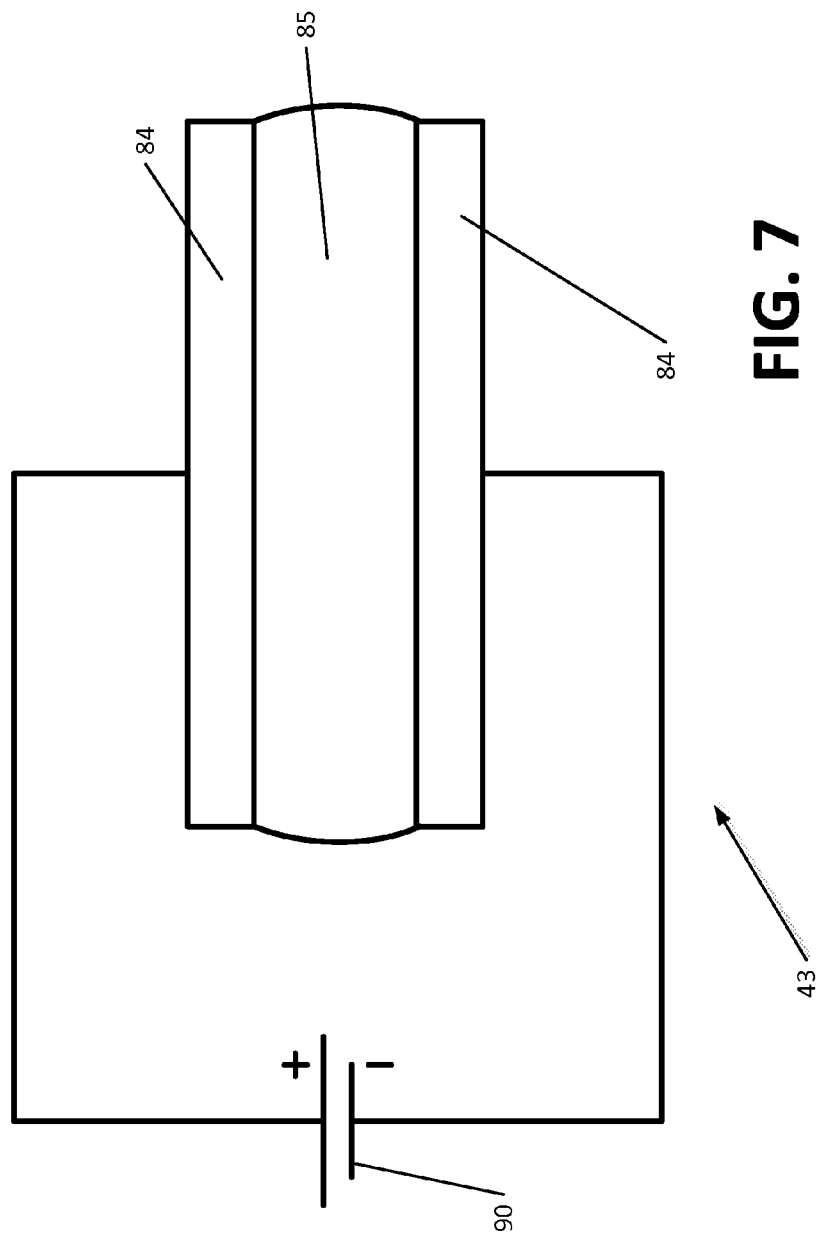
FIG. 7 is a schematic diagram of the portion of the sensor of FIG. 6, having a weight applied to the sensor.
Figure 8:
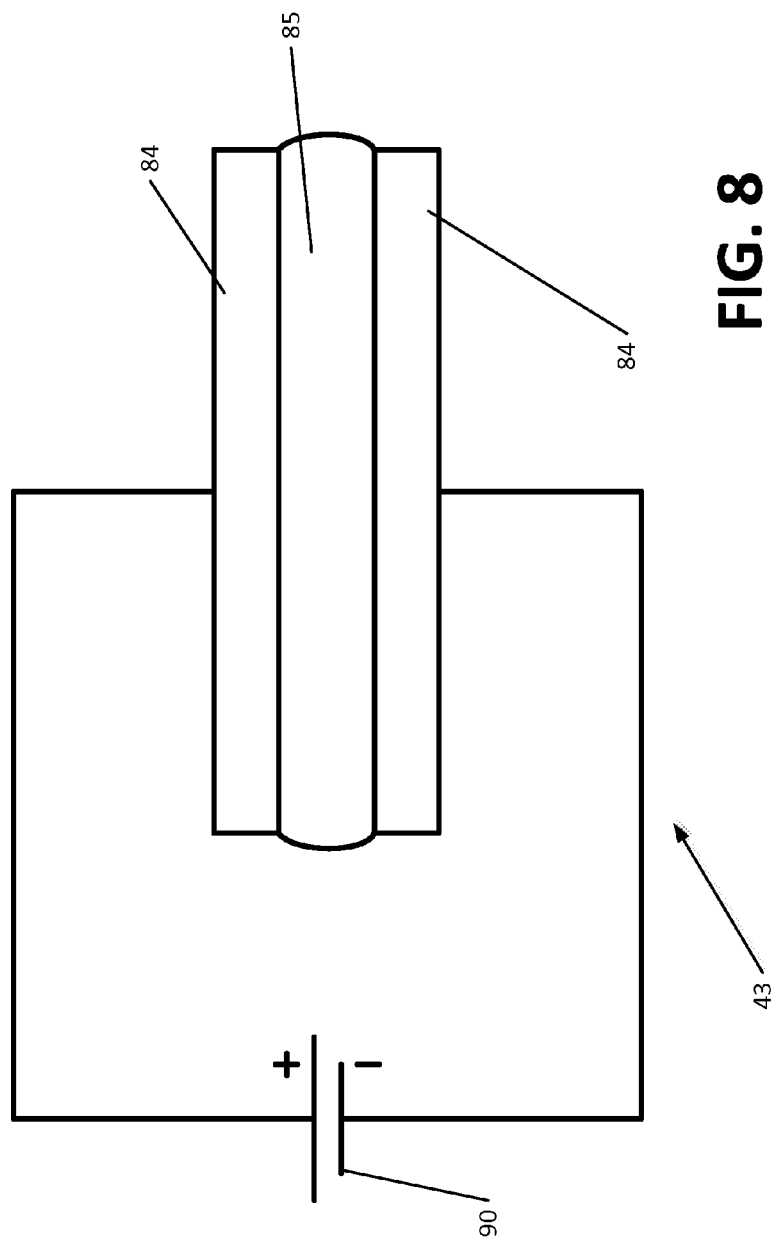
FIG. 8 is a schematic diagram of the portion of the sensor of FIG. 6, having the same weight applied to the sensor as FIG. 7 and having a differently-configured separation medium.
Figure 10:
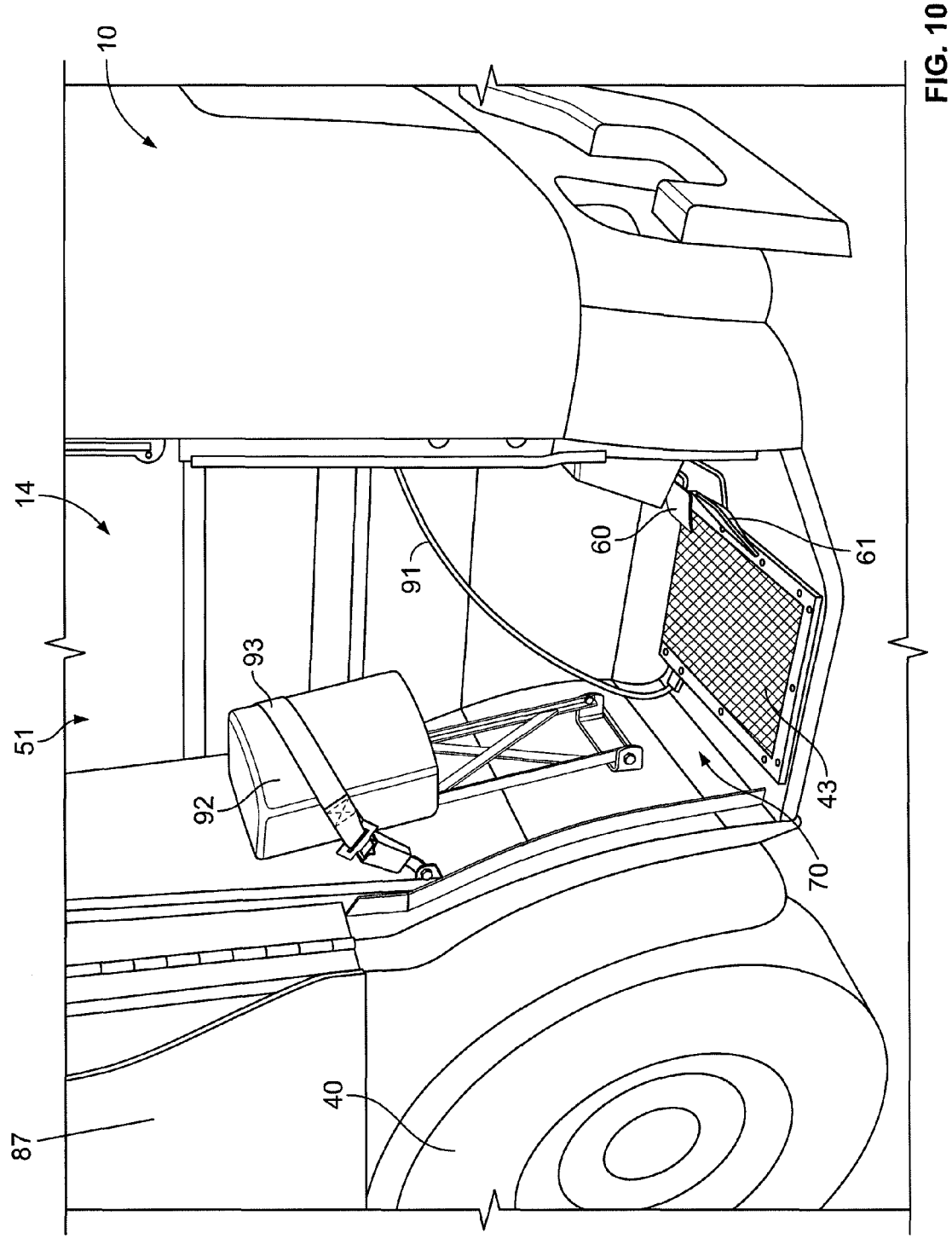
FIG. 10 is a side view of the operator cab of the vehicle of FIG. 2.

As shown in FIGS. 2 and 10, the cab 14 also has at least one operator sensor 43 that is configured for sensing the presence of the operator, such as whether the operator is in a proper operating position. In the embodiment of FIGS. 2 and 10, the cab 14 has a single operator sensor 43 in the right operator area 51, to sense the presence of the operator when operating the vehicle 10 in the right hand drive configuration. As shown in FIG. 10, the right operator area 51 may include a support 92 for supporting the operator, such as a pad for resting against the operator's back, as well as a safety belt 93 for the operator, which may be a lap belt, a shoulder belt, or a combination thereof. In another embodiment, the cab 14 may additionally or alternately have an operator sensor 43 in the left operator area 51, which may be incorporated into the seat 54. The operator sensor 43 may be a weight or pressure sensor pad, which can sense if the operator is standing on the pad 43, as in the embodiment shown in FIGS. 2 and 10. As illustrated in FIGS. 6-8, the sensor 43 may utilize a force sensing mechanism that includes two contacts 84 separated by a force-reactive separation medium 85. When force is applied to the sensor 43, the separation medium 85 is compressed, and the contacts 84 are moved closer together, as shown in FIGS. 7-8. Once the contacts 84 reach a sufficiently small distance, current from a source 90 can jump between the contacts 84, establishing an electrical connection and resulting in an activation of the sensor 43, i.e., indicating operator presence. In one embodiment, the contacts 84 are metal plates, and the separation medium 85 is an open-cell foam. As illustrated in FIG. 6, the foam separation medium 85 may be connected or connectable to an air supply 86 to control the amount of air within the foam, and thereby adjust the weight capacity of the separation medium 85. A greater amount of air in the foam makes compressing the separation medium 85 more difficult, and thus requires more force for activation of the sensor 43. The reverse is true as well. FIG. 7 illustrates compression of the mechanism with the separation medium 85 containing more air, and FIG. 8 illustrates compression of the mechanism under the same amount of force with less air in the separation medium 85. In one embodiment, the separation medium 85 is adjustable to require up to 70 lbs. for activation of the sensor 43, or in other words, to register the presence of the operator. Additionally, in one embodiment, the sensor 43 may include two circuits as shown in FIGS. 6-8, and the sensor 43 indicates the absence of the operator if both circuits sense the absence of the operator. The sensor 43 may be connected to a controller 71 of an operator monitoring system 70, as described below, such as by an electrical cable 91 having one end connected to the sensor 43 as shown in FIG. 10 and the other end connected to the controller 71.

Figure 12:
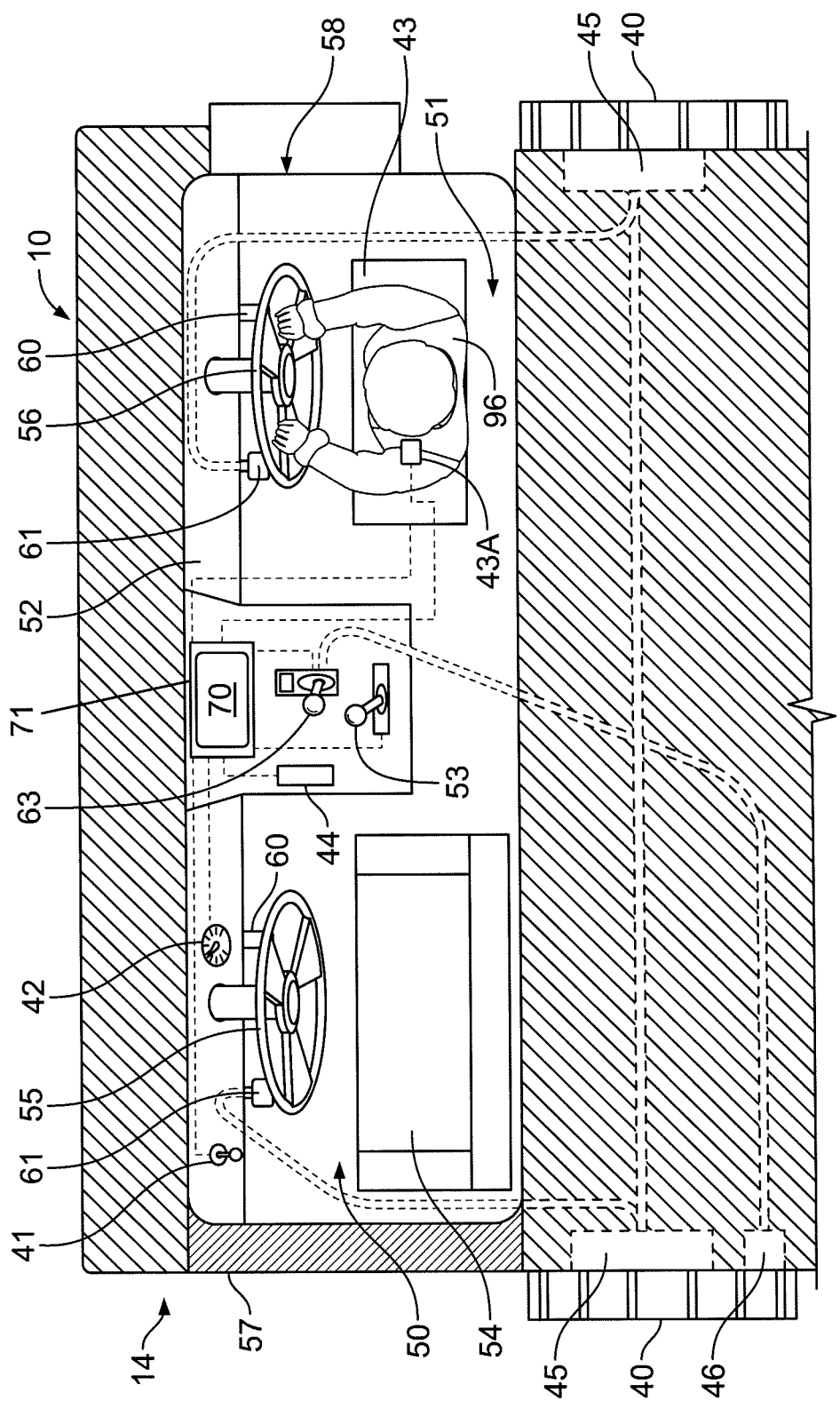
FIG. 12 is a top view of an inside of an operator cab of a vehicle according to another embodiment of the present invention.
Figure 13:
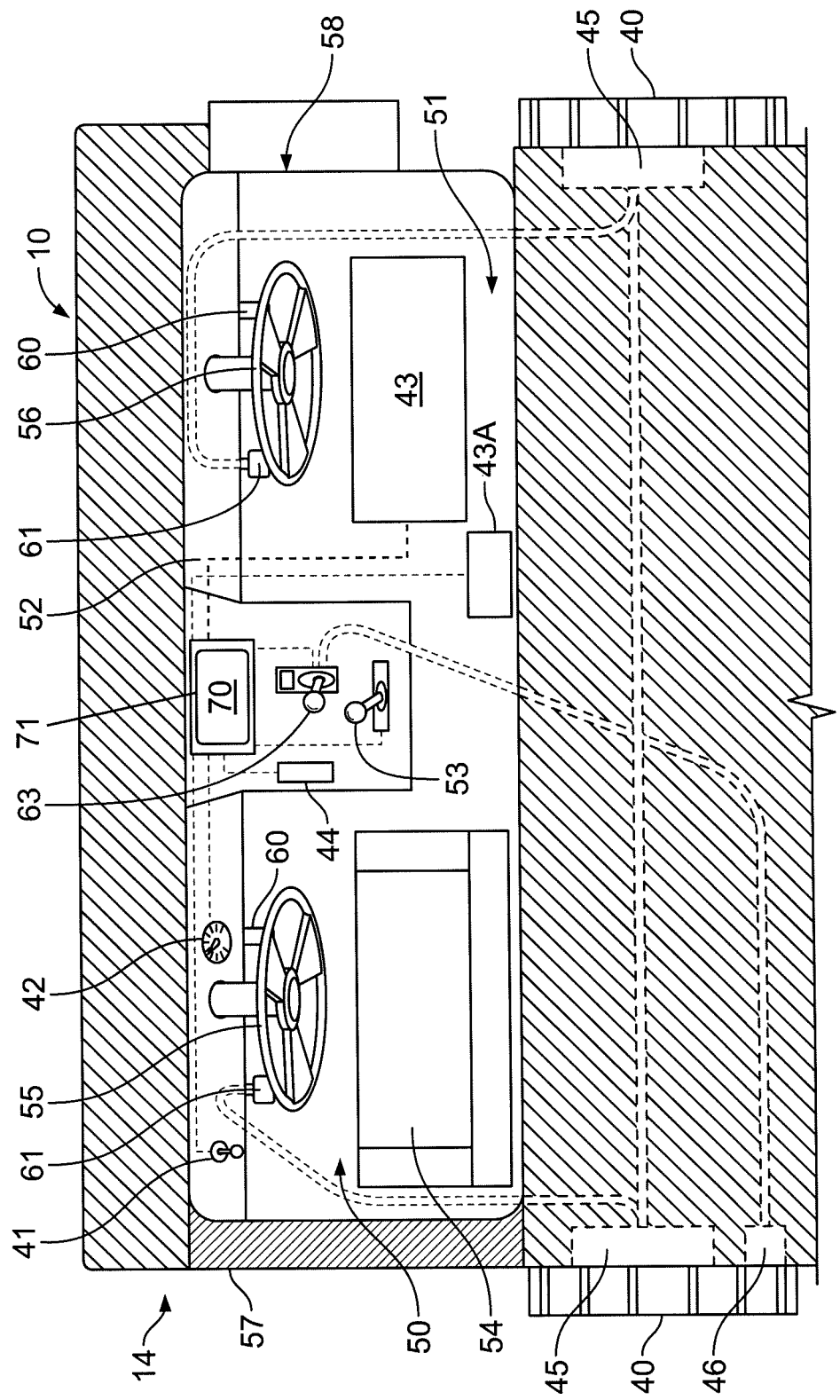
FIG. 13 is a top view of an inside of an operator cab of a vehicle according to another embodiment of the present invention.

In other embodiments, a different type of operator sensor 43 may be used, such as an optical or laser sensor to sense the operator's presence, an optical or light source worn by the operator and an associated sensor, a tag or bracelet worn by the operator and an associated sensor (e.g. an RFID tag/sensor or other proximity-based sensor), a releasable tether cord or other cord, a seat belt buckle indicator (such as on the belt 93), or any other type of sensor located on the vehicle 10 and/or coupled to the operator. As described below, an additional or alternate sensor 43A may be used in conjunction with, independently of, or in place of the sensor pad 43. FIGS. 12-13 illustrate examples of such an additional sensor 43A.

The vehicle 10 further includes an operator monitoring system, generally designated with the reference numeral 70. The operator monitoring system 70 generally includes a control module or controller 71 that is connected to and in communication with other components of the vehicle 10. As shown in FIGS. 2, 5, and 9-14, the control module 71 may be in communication with one or more of the main brake 45, the parking brake 46, the ignition 41, the speedometer 42, the mode control 53, the operator sensor 43, and additional or alternate operator sensor 43A, one or both doors 57, 87 (e.g. sensors 87A connected to the door(s) 57, 87 to determine when open), and/or the transmission controls 44 of the vehicle 10. The control module 71 may contain general computer components (not shown) as known in the art, such as a processor, a memory, input and/or output ports for wired and/or wireless communication, etc. Generally, the control module 71 contains at least an activation switch SW5, which activates safety features, as described in greater detail below.

Generally, the operator monitoring system 70 and the control module 71 control safety features that stop the movement of the vehicle 10 in unsafe situations, such as if the operator leaves the vehicle 10 before the vehicle has come to a complete stop and/or without activating the parking brake 46. In general, the operator monitoring system 70 automatically stops the vehicle 10 if the operator sensor 43 detects that the operator has left the vehicle 10 and the vehicle 10 is still moving and/or the parking brake 46 is not set. The operator monitoring system 70 can stop the vehicle 10 by any one or a combination of: activating the main brake 45, activating the parking brake 46, and/or shifting the transmission to neutral or another setting. It is understood that the controller 71 may transmit a signal that is configured to activate one or more of these safety features, as described below. Such a signal may be electrical, pneumatic, hydraulic, or another type, as well as combinations of such signals. The operator monitoring system 70 may utilize different criteria in other embodiments. For example, in one embodiment, the system 70 may require the transmission to be in a specific gear (e.g., 1st, 2nd, 3rd, etc.) or setting (e.g., D, N, and/or R) for activation. As another example, the system 70 may require a different drive mode (LH or RH) for activation.

Figure 3:
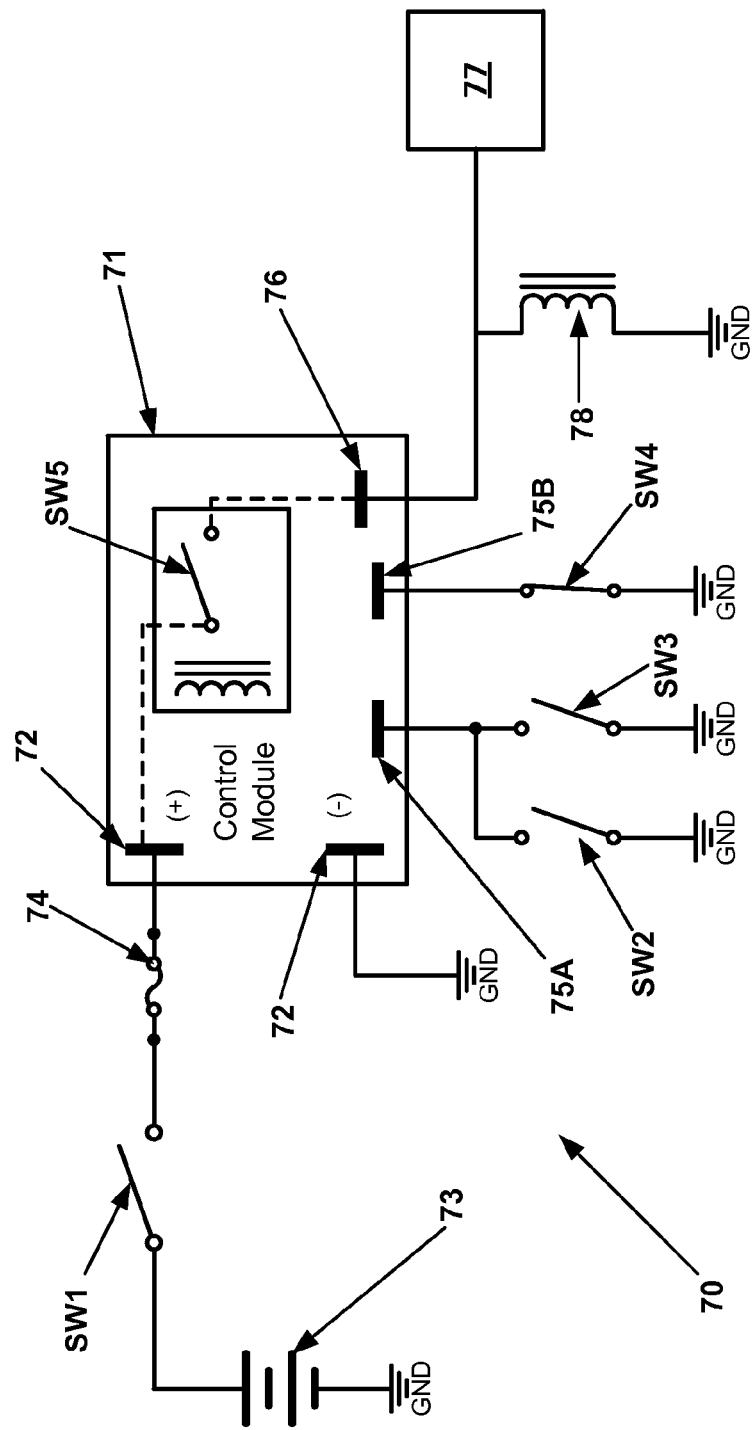
FIG. 3 is a schematic diagram showing an electrical circuit of an operator monitoring system according to one embodiment of the present invention.
Figure 9:
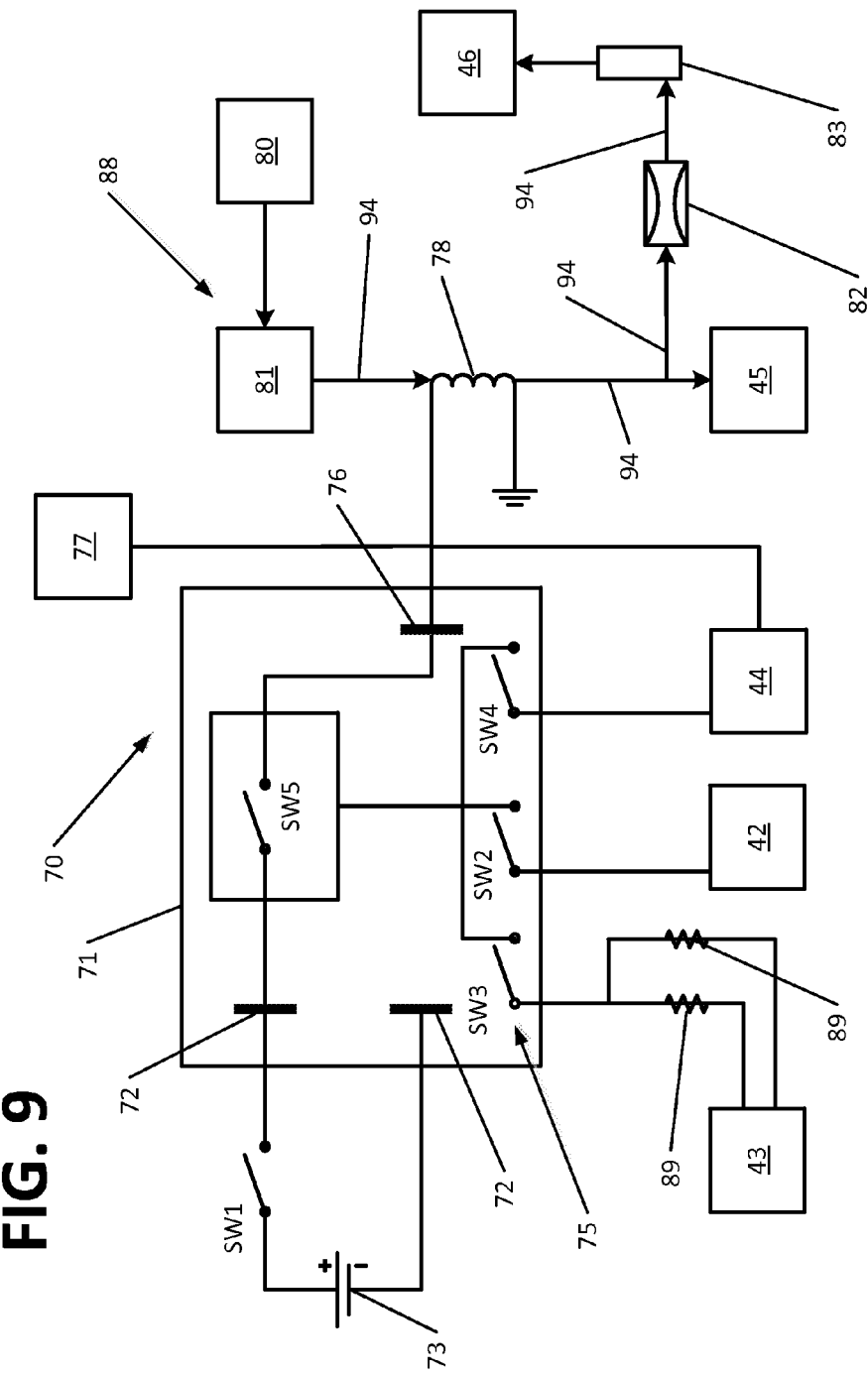
FIG. 9 is a schematic electrical and pneumatic diagram showing one embodiment of an operator monitoring system and an actuation system configured for use with the vehicle of FIG. 2.

FIGS. 3 and 9 illustrate example embodiments of an operator monitoring system 70 for controlling safety features according to the present invention. As shown in FIGS. 3 and 9, the control module 71 includes (+) and (−) power inputs 72 that are connected externally to a battery 73 (such as a common 12V battery) or other power source (e.g. AC and/or DC). An ignition switch SW1 and optionally a fuse 74 (e.g. 3-5 A) connect the battery 73 to the power inputs 72. The control module 71 in FIG. 3 also has two inputs, with one input 75A connected to two switches SW2, SW3, and a second input 75B connected to another switch SW4, the operation and significance of which are described below. The control module 71 embodiment in FIG. 9 is connected to switches SW2, SW3, and SW4 separately. The control module 71 of FIG. 3 further has an output 76 connected to at least one of the main brake 45, the parking brake 46, and the transmission or transmission control 44, and optionally a counter 77 (described below). The activation switch SW5 in FIGS. 3 and 9 is connected to the power inputs 72 and to the output 76, so that when the activation switch SW5 is closed, power can flow through the output 76. The control module 71 may be appropriately grounded, as shown in FIG. 3. Additionally, in the embodiment of FIG. 9, the connection 75 between the controller 71 and the sensor 43 contains fault detection features to alert the controller 71 if there is a fault in the sensor 43, such as the connection 75 being disconnected/unplugged or the sensor 43 having an electrical fault (e.g. a short). In this embodiment, the fault detection features include two resistors 89 located at the contacts between the sensor 43 and the controller 71, enabling the controller 71 to detect the fault. In an open circuit, the current flows through the resistors 89, creating a voltage drop that allows detection of the fault. The controller 71 may activate the safety features, shut down the activation system 71, activate an indicator light, and/or take other appropriate action in case of a fault. The connection 75 between the controller 71 and the sensor 43 in FIG. 9 indicates the connection of the two circuits within the sensor 43, and the connection may be different if the sensor 43 includes a different circuit configuration. It is understood that any embodiment may use the input and/or output configurations of FIG. 3 or FIG. 9, or another input configuration. It is also understood that one or more of the input and/or output connections 72, 75, 75A, 75B, 76 of the controller 71 illustrated in FIG. 3 or 9 may be part of an electrical harness that is connected to the controller 71 and the various components.

Figure 4:
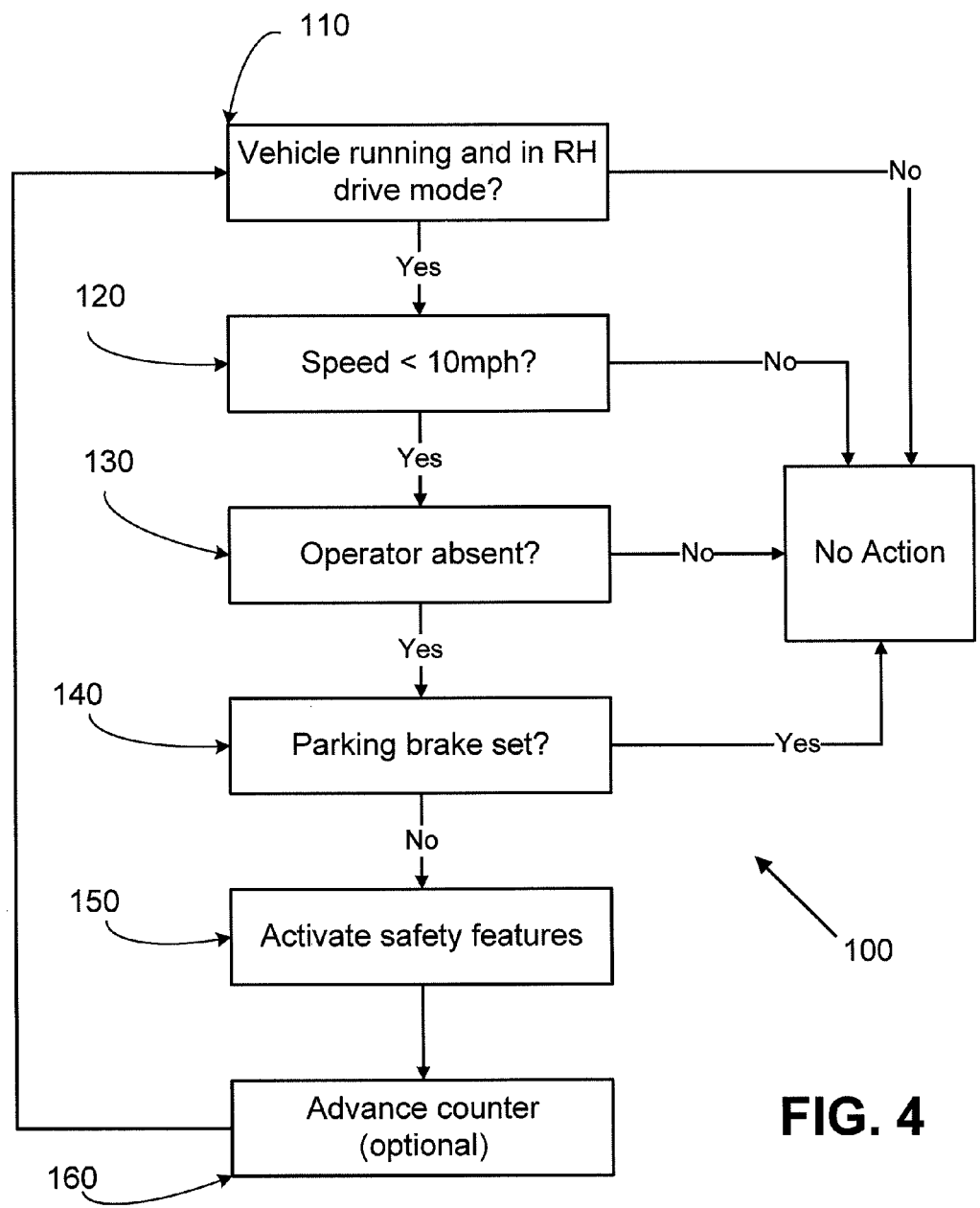
FIG. 4 is a flow diagram showing one embodiment of a logical sequence executed using the electrical circuit of FIG. 3.
Figure 5:
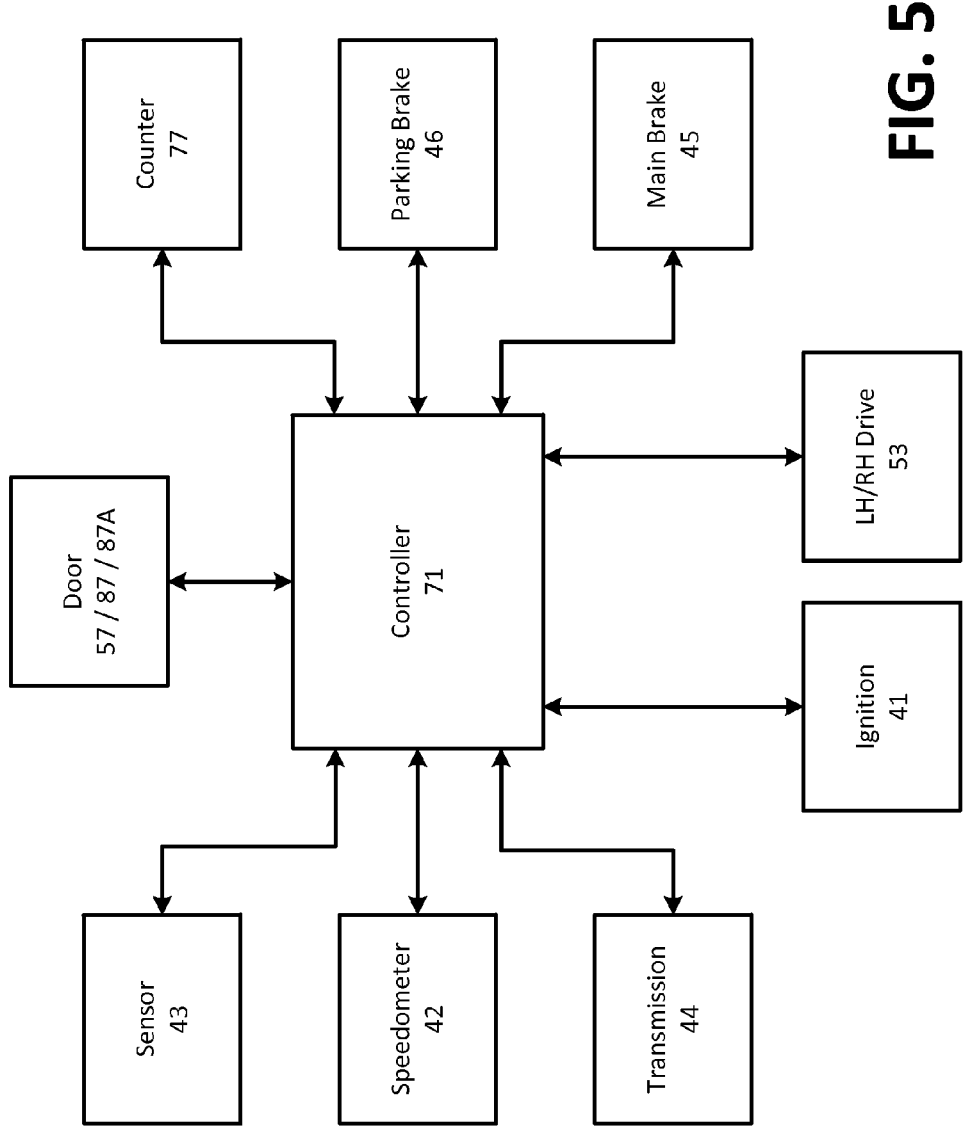
FIG. 5 is a schematic diagram of the operator monitoring system of FIG. 3, showing connections between a controller 71 and multiple components.

FIG. 4 illustrates an example of a process 100 for activating safety features utilizing the operator monitoring system 70 of FIGS. 3 and/or 9. In this embodiment, the vehicle 10 is running and is also in right-hand drive mode (110), and the speed of the vehicle 10 is less than 10 mph (120), and the operator is absent (130), and the parking brake 46 is not set (140), then safety features are activated to stop the vehicle (150), and optionally the counter 77 is advanced (160). This process 100 is described in greater detail below.

Step 110 corresponds to the ignition switch SW1 in FIG. 3. If the vehicle 10 ignition has been activated (i.e. the vehicle is running) and the vehicle 10 is in the right hand drive mode or configuration, then the ignition switch SW1 is activated. It is understood that the ignition 41 and the mode controller 53 may be connected to the operator monitoring system 70 to control activation of the ignition switch SW1, as shown in FIGS. 3 and 9. In the embodiments of FIGS. 3 and 9, the ignition switch SW1 is activated by closing the switch SW1, but may also be activated by opening the switch.

Step 120 corresponds to the switch SW2 in FIGS. 3 and 9. If the speed of the vehicle is within a predetermined threshold range or less than a predetermined threshold speed of 10 mph, the switch SW2 is activated. In another embodiment, the switch SW2 is not activated if the speed of the vehicle is zero or substantially zero, and a different threshold speed or range may be used instead of 0-10 mph. For example, in one embodiment, the threshold speed may be up to 35 mph, and in another embodiment, any speed above zero may be used. The threshold speed can be used to help prevent accidental activation of the operator monitoring system 70 when the vehicle 10 is moving at higher rates of speed, as it is unlikely that the operator will attempt to leave the vehicle at speeds in excess of 10 mph. It is understood that the speedometer 42 may be connected to the operator monitoring system 70 to control activation of the switch SW2, as shown in FIGS. 3 and 9. In the embodiment of FIG. 3, the switch SW2 is activated by opening the switch SW2, although the switch SW2 may also be activated by closing the switch SW2.

Step 130 corresponds to the switch SW3 in FIGS. 3 and 9. If the operator sensor 43 detects that the operator is absent from the cab 14 or otherwise not in proper operating position, the switch SW3 is activated. It is understood that the operator sensor 43 may be connected to the operator monitoring system 70 to control activation of the switch SW3, as shown in FIG. 3. In the embodiment of FIG. 3, the switch SW3 is activated by opening the switch SW3, although the switch SW3 may also be activated by closing the switch SW3. In one embodiment, the operator monitoring system 70 may include a delay feature, where the operator sensor 43 may not detect the operator is absent and/or the switch SW3 may not activate unless the sensor 43 detects the operator's absence for at least a threshold time. Such a threshold time may be in the range of 100-200 ms in one embodiment, and may be shorter or longer in other embodiments, such as about 750 ms in another embodiment. This delay feature can prevent unnecessary activation of the operator monitoring system 70 if the operator moves slightly during travel, such as due to a bump in the road, a slip, etc.

Step 140 corresponds to the switch SW4 in FIGS. 3 and 9. If the parking brake 46 is not set or engaged, the switch SW4 is activated. It is understood that the parking brake 46 and/or the parking brake actuator 63 may be connected to the operator monitoring system 70 to control activation of the switch SW4, as shown in FIGS. 3 and 9. In the embodiment of FIG. 3, the switch SW4 is activated by opening the switch SW4, although the switch SW4 may also be activated by closing the switch SW4.

If the switches SW1, SW2, SW3, and SW4 are all activated, then the activation switch SW5 is activated to engage the safety features. In the embodiment of FIGS. 3 and 9, the activation switch SW5 is activated by closing the switch SW5, which allows power to flow from the battery 73 to a brake solenoid 78 coupled to the main brake 45 and the parking brake 46, as well as the transmission or transmission control 44 and optionally the counter 77. As described in greater detail below and shown in FIG. 9, the brake solenoid 78 activates both the main brake 45 and the parking brake 46 to stop the vehicle 10. The main brake 45 may be released after stopping, and the parking brake 46 may remain locked until manually released by the operator. In this embodiment, the transmission is also shifted to neutral to assist in stopping the vehicle 10, and may remain in neutral until manually shifted by the operator. A transmission containing an auto-neutral feature, as described above, may facilitate shifting the transmission to neutral. In one alternate embodiment, the safety features of the system 70 may be implemented without shifting the transmission to neutral. In a further embodiment, the system 70 may be configured for shifting the transmission to neutral only if the transmission contains an auto-neutral feature, or the system 70 may require an auto-neutral feature for operation. In other embodiments, engaging the safety features may additionally or alternately include performing different actions. For example, some type of audio and/or visual alert may be activated by the engagement of the safety features, such as a horn, an alarm (e.g. an anti-theft-type alarm), blinking lights, etc.

FIG. 9 illustrates the operator monitoring system 70 in connection with an actuation system 88 for actuating the main brake 45 and/or the parking brake 46. In this embodiment, the actuation system 88 is a pneumatic system that uses air or another pneumatic fluid, with pressure supplied by a pneumatic source 80 and regulated by pressure regulator 81 throughout a plurality of pneumatic lines or vessels 94. In another embodiment, the actuation system 88 may be a different type of system, including a hydraulic system, an electronic system, etc. The pressure may be regulated at 44 psi in one embodiment, or at another appropriate pressure. In this embodiment, the solenoid 78 is configured for opening and closing to control pneumatic pressure to the downstream components of the actuation system 88, such as the main brake 45 and the parking brake 46. For example, the solenoid 78 may include or be connected to a valve (not shown) on the actuation system 88 in one embodiment. In the embodiment of FIG. 9, the solenoid 78 is closed under normal operating parameters. When all conditions are met for the operator monitoring system 70 to activates the safety features, such as by activating switch SW5, the solenoid 78 is energized and opens to transmit the pneumatic signal to the main brake 45 and the parking brake 46. The pneumatic signal activates both the main brake 45 and the parking brake 46 to stop the vehicle. The actuation system 88 may include a delay apparatus 82 to delay the signal from reaching the parking brake 46 and thereby delay activation of the parking brake 46 for a predetermined time after activation of the main brake 45. For example, in the embodiment of FIG. 9, the delay apparatus 82 is a narrowed orifice that slows down the pneumatic flow traveling to the parking brake 46. This permits the main brake 45 to partially or completely stop the vehicle 10 before the parking brake 46 is actuated. In one embodiment, the delay apparatus 82 is a 0.040" orifice fitting or a differently-sized orifice fitting. In another embodiment, the delay apparatus 82 may be a second solenoid that has a delay in opening after the first solenoid 78, such as by a timer-delayed actuation or actuation by a different condition (e.g. the vehicle speed registering zero). Additionally, the delay apparatus 82 may delay the signal at least 0.75 seconds in one embodiment, and may delay the signal for about 2 seconds in another embodiment. The actuation system 88 also includes a double check valve 83, through which the air flows to reach the parking brake 46. The double check valve 83 allows the right-hand parking brake control valve to be reset, either by the controller 71 or the left-hand parking brake control valve (which can be manually operated, and is not shown). Once the parking brake 46 is engaged, the switch SW4 deactivates, which deactivates the safety features and resets the operator monitoring system 70 to normal operating parameters, such as by deactivating switch SW5 and de-energizing the solenoid 78. The parking brake 46 can then be manually deactivated and the vehicle 10 can resume operation.

As described above, in one embodiment, the operator monitoring system 70 also includes an electrical counter 77. The counter 77 is connected to the control module 71, and records a count that is advanced by one each time the safety features are activated, such as by activating the activation switch SW5 of the control module 71. This allows the counter 77 to count the number of times the safety features were activated, due to the operator's particular operation of the vehicle 10. The operator's employer, manager, etc. may use the data collected by the counter 77 to evaluate operator performance and take action accordingly, such as appropriate corrective action. It is understood that the counter 77 may not be located on the vehicle 10, and may be a remotely located device in wireless communication with the control module 71.

Therefore, as described above with respect to FIGS. 3 and 4, in one exemplary embodiment, if the operator exits the cab prematurely, the control module is activated to engage the safety features to stop the vehicle 10, including engaging both the main brake 45 and the parking brake 46 and shifting the transmission to neutral. When this occurs, the count recorded by the counter 77 is advanced by one. In other embodiments, this sequence may occur differently, as described elsewhere herein. In addition, in other exemplary embodiments, a single safety feature can be activated or a combination of the features discussed herein can be activated.

It is understood that the embodiment of the operator monitoring system 70 illustrated in FIG. 3 and the associated embodiment of the process 100 in FIG. 4 represent only one possible configuration for controlling the functions of the safety features described herein, and that other embodiments are possible. For example, the control module 71 may be altered so that certain switches may be active in a different configuration (i.e. closed or open) than described above, and the control module 71 may contain a greater or smaller number of connections and switches related to different or additional components. Additionally, the process for activation of the safety features may take into account additional or alternate variables, such as those described above. As one example, the operator monitoring system 70 may not take into account both the engagement of the parking brake 46 and the speed of the vehicle 10. In one embodiment, the operator monitoring system 70 may be activated if the operator leaves the vehicle 10 and the speed of the vehicle 10 is above zero or substantially zero. In another embodiment, the operator monitoring system 70 may be activated if the operator leaves the vehicle 10 and the parking brake 46 is not engaged, regardless of the speed of the vehicle 10.

Figure 11:
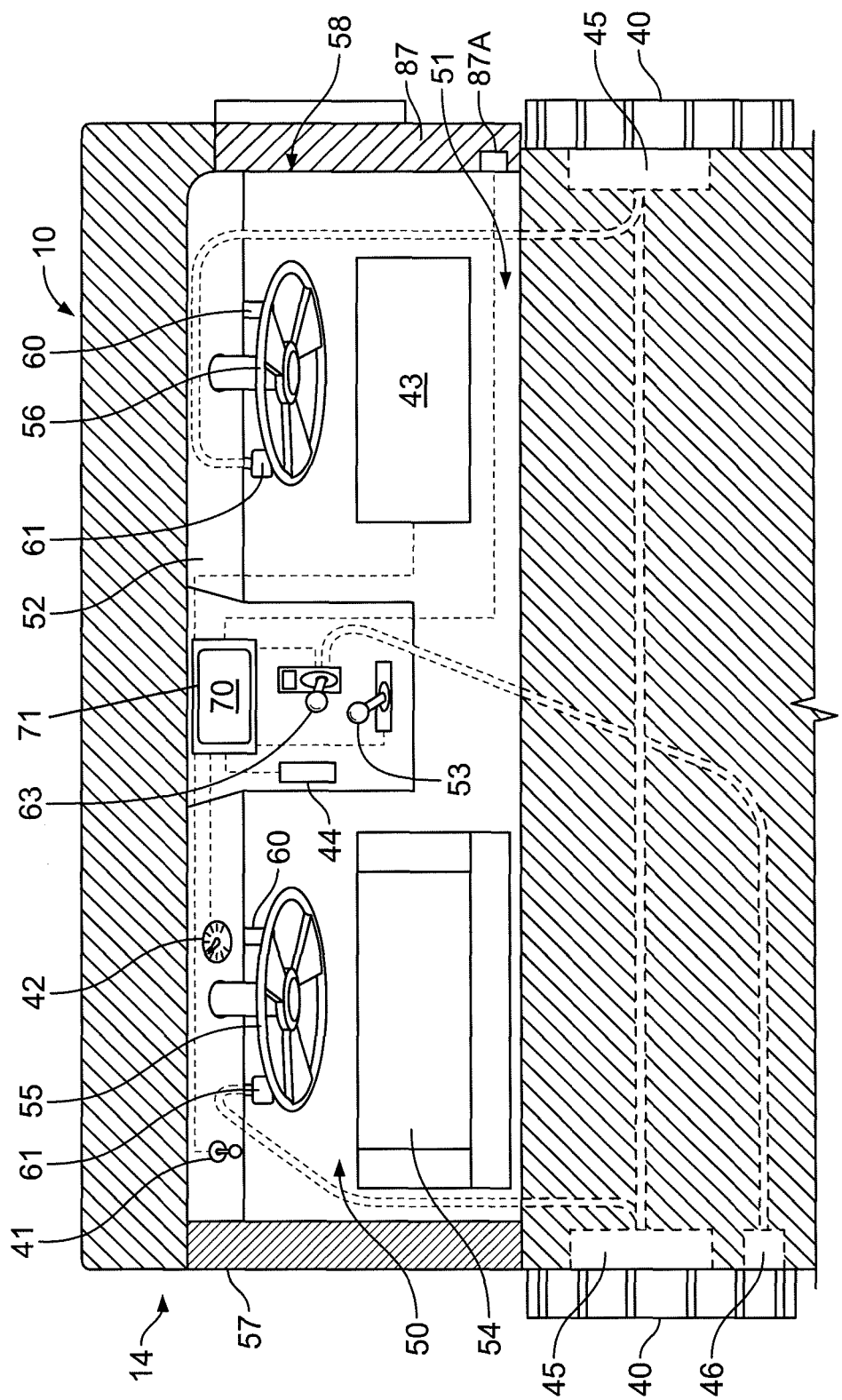
FIG. 11 is a top view of an inside of an operator cab of a vehicle according to another embodiment of the present invention.

In another embodiment, illustrated in FIG. 11, the vehicle 10 may include a right hand door 87, and the operator monitoring system 70 may additionally or alternately incorporate the position of the door 87 in the calculation. The door 87 may include a sensor 87A to indicate the position of the door 87 to the controller 71. For example, the system 70 may engage the safety features if the door 87 is open and the vehicle speed is within a threshold range as described above. The position of the door 87 may be factored by the control module 71 in addition to the operator sensor 43, as shown in FIG. 11, or may be used as a replacement for the input from the operator sensor 43 in another embodiment. The door 87 may be a swinging door, such as the left hand door 57, or may lift or rotate upward and/or backward to open, as shown in FIG. 11. It is understood that the left hand door 57 may be incorporated if the system 70 is active in the left hand drive configuration.

In other embodiments, illustrated in FIGS. 12-13, the system 70 may include an additional operator sensor 43A of a different type than the mat sensor 43, as described above. In these embodiments, the additional sensor 43A is configured to work in conjunction with the sensor 43 to detect operator absence. In other words, the controller 71 may detect the operator to be absent only when both sensors 43, 43A indicate the operator's absence. For example, the additional sensor 43A may be an optical or laser sensor to sense the operator's presence, an optical or light source worn by the operator and an associated sensor, a tag or bracelet worn by the operator and an associated sensor (e.g. an RFID tag/sensor or other proximity based sensor), a releasable tether cord or other cord, a seat belt buckle indicator, or any other type of sensor located on the vehicle 10 and/or coupled to the operator. At least some of these features may be incorporated into a lap belt or similar device worn by the operator 96. In another embodiment, the additional sensor(s) 43A of FIGS. 12-13 may be used independently of the mat sensor 43 and/or as a replacement for the mat sensor 43 in another embodiment. For example, the controller 71 may indicate that the operator is absent if either the sensor 43 or the additional sensor 43A indicates absence. In another example, the additional sensor 43A may be used to detect operator presence only when the sensor 43 is detected to be malfunctioning. In a further example, the controller 71 may rely exclusively on the sensor 43A for detecting operator presence.

FIG. 12 illustrates an additional sensor 43A being worn by the operator 96, such as an RFID tag, and used in conjunction with the mat sensor 43. FIG. 13 illustrates an additional sensor 43A that is located inside the cab of the vehicle 10, such as an optical or laser sensor or a seat belt buckle sensor. In one embodiment, a sensor 43A located on the operator 96 as shown in FIG. 12 and a sensor 43A located on the vehicle 10 as shown in FIG. 13 may be used in conjunction with each other, with the two sensors 43A combining to sense the presence or absence of the operator 96. For example, the sensor 43A on the operator 96 may be an RFID tag and the sensor 43A on the vehicle 10 may sense the presence of the RFID tag to monitor the operator 96.

Figure 14:
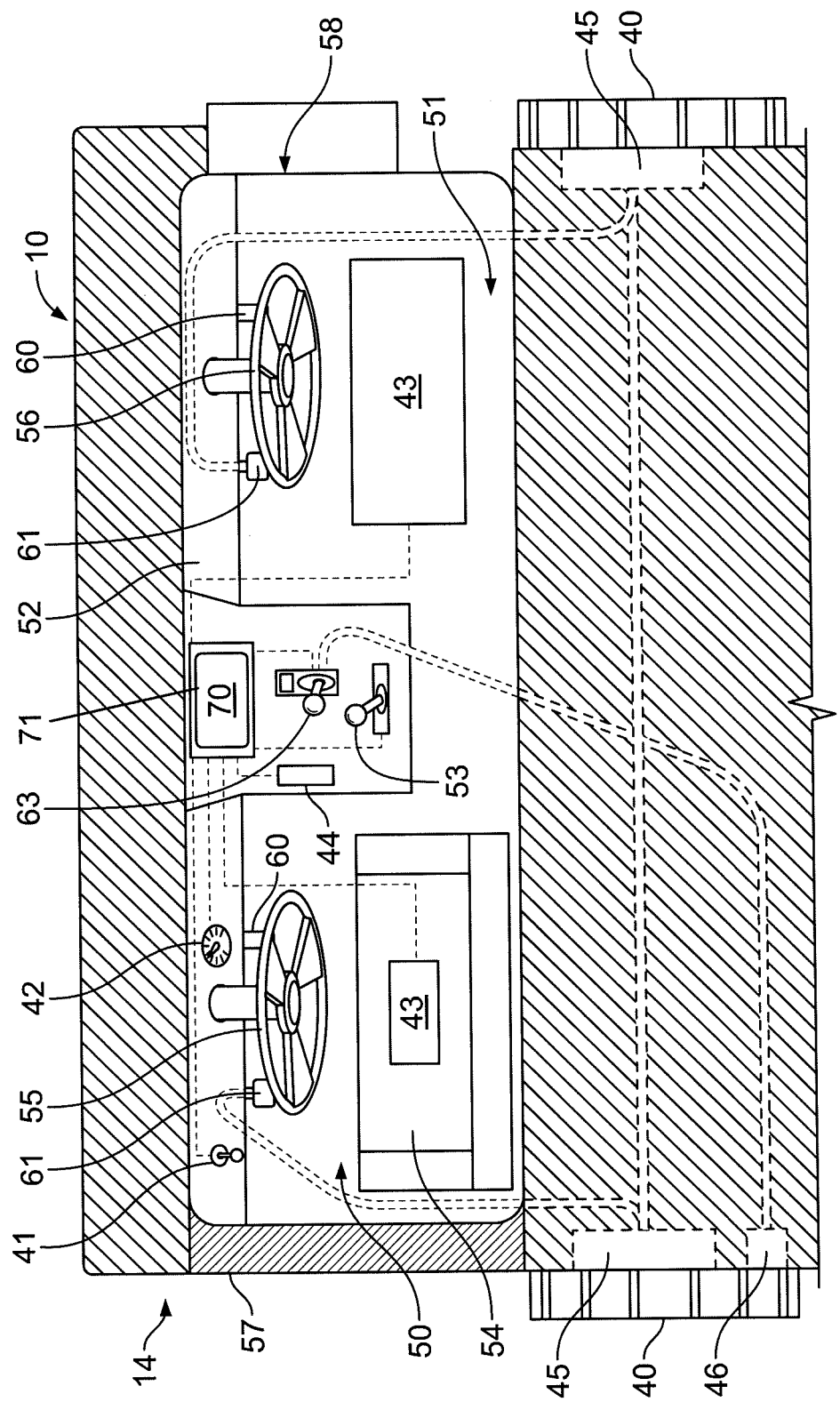
FIG. 14 is a top view of an inside of an operator cab of a vehicle according to another embodiment of the present invention.

In other embodiments, the operator monitoring system 70 may monitor the operator in either the left hand drive configuration or the right hand drive configuration, or only in the left hand drive configuration. In the left hand drive configuration, a sensor 43 may be located in the seat 54 to monitor operator presence, as described above, or the left hand drive may be configured for standing drive (such as in countries where vehicles drive on the left). FIG. 14 illustrates one embodiment of the system 70 that includes one sensor 43 in the form of a mat located on the right hand side, and another sensor 43 in the form of a seat sensor to sense the presence of the operator in the left hand driver's seat 54. The sensor 43 on the seat 54 may detect operator presence by weight, pressure, heat, or other technique. In a further embodiment, the operator monitoring system 70 may be configured for operation in any standing drive configuration, whether right or left hand. Still further embodiments and variations are contemplated.

The operator monitoring system of the present invention provides benefits and advantages over existing designs. The system can assist in minimizing or avoiding the risk of damage caused by an unattended moving vehicle, such as injury to a bystander or damage to property such as parked cars and residences. A truck traveling 10 mph can take 30 feet or more to stop even with brakes applied, and can do significant damage in such circumstances. The activation of the safety features can limit the distance the vehicle travels unattended, and in many cases can limit the potential for damage caused by such an unattended vehicle. The system can also allow an employer or truck owner to more effectively evaluate the performance of vehicle operators and to take appropriate action. The operator monitoring system and safety features described herein can be used in various other applications, such as delivery vehicles, passenger vehicles, construction equipment (e.g. cranes, graders, steamrollers, etc.), farm equipment, forklifts, mowers, watercraft, and others, and may include use of the operator monitoring system to monitor presence of the operator in a left-hand drive configuration.

While the specific embodiments have been illustrated and described, numerous modifications come to mind without significantly departing from the spirit of the invention, and the scope of protection is only limited by the scope of the accompanying Claims.

What is claimed is:

1. A refuse truck comprising:
   a chassis supporting a truck body and an operator cab and being connected to a plurality of wheels;
   a main brake operably connected to at least one of the wheels;
   a parking brake operably connected to at least one of the wheels;
   a transmission operably connected to transfer power to at least one of the wheels; and
   an operator monitoring system comprising:
      an operator sensor configured to sense whether the operator is in a proper operating position within the operator cab; and
      a control module connected to the operator sensor and further connected to at least one of the main brake, the parking brake, and the transmission,
      wherein when the refuse truck is running and the operator sensor senses that the operator is not in the proper operating position, the control module is configured to activate safety features to stop the truck, including at least one selected from a group consisting of: activating the main brake, activating the parking brake, shifting the transmission to a different setting, and any combination thereof,
      wherein the operator cab has a left steering wheel and a right steering wheel, and the truck is adjustable between a left hand drive configuration and a right hand drive configuration, and wherein the control module activates the safety features only if the truck is in the right hand drive configuration.

2. The refuse truck of claim 1, wherein the operator sensor comprises at least one selected from the group consisting of: a weight-sensitive or pressure-sensitive mat, an optical or laser sensor, an optical or light source on the vest of the operator and associated sensor, an RFID tag or bracelet worn by the driver and associated sensor, a releasable tether cord, a seat belt buckle indicator, an indicator of whether a door of the operator cab is open, and any combination thereof.

3. The refuse truck of claim 1, wherein the operator sensor comprises a weight-sensitive or pressure-sensitive mat including a sensor circuit comprising a pair of contacts separated by a force-reactive separation material, wherein upon application of weight or pressure to the contacts by the presence of the operator, the separation material compresses and permits the contacts to establish an electrical connection to detect the presence of the operator.

4. The refuse truck of claim 1, wherein the control module activates the safety features only if the parking brake is not engaged.

5. The refuse truck of claim 1, wherein the control module activates the safety features only if the speed of the vehicle is less than 10 mph.

6. The refuse truck of claim 1, wherein the control module activates the safety features only if the speed of the vehicle is within a threshold speed range.

7. The refuse truck of claim 1, wherein the control module activates the safety features only if the speed of the vehicle is within a threshold speed range and the parking brake is not engaged.

8. The refuse truck of claim 1, wherein the control module activates the safety features to stop the truck by activating the main brake, activating the parking brake, and shifting the transmission to neutral.

9. The refuse truck of claim 1, further comprising an electronic counter in communication with the control module, wherein the electronic counter records a count and advances the count by one each time the control module activates safety features to stop the truck.

10. The refuse truck of claim 1, wherein the operator monitoring system further comprises:
    a first switch configured to be activated when the ignition of the truck is activated and the truck is in the right-hand drive configuration;
    a second switch configured to be activated when a speed of the truck is within a threshold range;
    a third switch configured to be activated when the operator sensor senses that the operator is not in the proper operating position;
    a fourth switch configured to be activated when the parking brake is not engaged; and
    an activation switch within the control module that is configured to activate the safety features when the first, second, third, and fourth switches are all activated.

11. The refuse truck of claim 1, further comprising a pneumatic system having a solenoid connected to the operator monitoring system, wherein activation of the safety features energizes the solenoid to pneumatically activate at least one of the main brake and the parking brake.

12. The refuse truck of claim 11, wherein the pneumatic system activates the main brake and the parking brake, and wherein the pneumatic system comprises a narrowed orifice fitting downstream from the main brake, the orifice fitting delaying the activation of the parking brake until at least 0.75 seconds after activation of the main brake.

13. An operator monitoring system for use with a vehicle configured for operation by an operator in a standing position, the system comprising:
   an operator sensor configured to sense whether the operator is in a proper standing operating position within the operator cab, the operator sensor comprising a floor mat configured to be placed on a floor of the vehicle and having a force sensor configured to sense the presence of the operator standing on the floor mat; and
   a control module connected to the operator sensor and configured for connection to a brake of the vehicle,
   wherein when the operator sensor senses that the operator is not in the proper standing operating position, the control module is configured to activate safety features to stop the truck, the safety features including transmitting a signal configured to activate a brake of the vehicle to stop the vehicle.

14. The system of claim 13, wherein the control module further includes inputs configured for detecting speed of the vehicle and engagement of a parking brake, and wherein the control module activates the safety features if the speed of the vehicle is within a threshold speed range and the parking brake is not engaged.

15. The system of claim 13, wherein the control module activates the safety features to stop the truck by transmitting at least one signal to activate a second brake of the vehicle and to shift a transmission of the vehicle to neutral.

16. A vehicle comprising:
   a chassis supporting a body and an operator cab and being connected to a plurality of wheels, the operator cab having a standing area for the operator to operate the vehicle in a standing position;
   a first brake operably connected to at least one of the wheels; and
   an operator monitoring system comprising:
      an operator sensor configured to sense whether the operator is in a proper standing operating position within the standing area of the operator cab; and
      a control module connected to the operator sensor and further connected to the first brake,
      wherein when the vehicle is running and the operator sensor senses that the operator is not in the proper standing operating position, the control module is configured to activate safety features to stop the truck, the safety features including activating the first brake.

17. The vehicle of claim 16, wherein the operator cab has a left operator area having a seat for the operator to operate the vehicle in a left-hand drive configuration and a right operator area having the standing area for the operator to operate the vehicle in a standing right-hand drive configuration, the vehicle further comprising a selector for selecting between the left-hand drive configuration and the standing right-hand drive configuration, and wherein the control module is configured to activate the safety features only when the standing right-hand drive configuration is selected.

18. The system of claim 16, wherein the control module further includes inputs configured for detecting speed of the vehicle and engagement of the first brake, and wherein the control module activates the safety features if the speed of the vehicle is within a threshold speed range and the first brake is not engaged.

19. The system of claim 16, wherein the vehicle further includes a second brake operably connected to at least one of the wheels and a transmission operably connected to transfer power to at least one of the wheels, and wherein the safety features further include at least one of activating the second brake and shifting the transmission to neutral.

20. The system of claim 16, wherein the operator sensor comprises a mat sitting on a floor of the standing area in the operator cab and having a force sensor configured to sense the presence of the operator standing on the mat.

21. A refuse truck comprising:
   a chassis supporting a truck body and an operator cab and being connected to a plurality of wheels, the operator cab including a left operator area having a seat for the operator to operate the vehicle in a left-hand drive configuration and a right operator area having a standing area for the operator to operate the vehicle in a standing right-hand drive configuration;
   a selector for selecting between the left-hand drive configuration and the standing right-hand drive configuration;
   a main brake operably connected to at least one of the wheels;
   a parking brake operably connected to at least one of the wheels;
   a transmission operably connected to transfer power to at least one of the wheels; and
   an operator monitoring system comprising:
      an operator sensor configured to sense whether the operator is in a proper standing operating position within the standing area of the right operator area of the operator cab; and
      a control module connected to the operator sensor and further connected to the main brake, the parking brake, and the transmission,
      wherein when the refuse truck is running in the standing right-hand drive configuration and the operator sensor senses that the operator is not in the proper standing operating position, the control module is configured to activate safety features to stop the truck, including activating the main brake, activating the parking brake, and shifting the transmission to a different setting, and
      wherein the operator monitoring system further comprises a delay apparatus configured to delay the activation of the parking brake until a predetermined time after activation of the main brake.

22. The refuse truck of claim 21, further comprising a pneumatic system connected to the main brake and the parking brake, the pneumatic system having a solenoid connected to the operator monitoring system, wherein activation of the safety features energizes the solenoid to pneumatically activate the main brake and the parking brake, and wherein the delay apparatus delays a pneumatic signal from reaching the parking brake after activation of the main brake.

23. The refuse truck of claim 22, wherein the delay apparatus is a narrowed orifice located on a pneumatic line between the main brake and the parking brake.

24. The refuse truck of claim 21, wherein the operator sensor includes a sensor circuit comprising a pair of contacts separated by a force-reactive separation material, wherein upon application of weight or pressure to the contacts by the presence of the operator, the separation material compresses and permits the contacts to establish an electrical connection to detect the presence of the operator.

25. The refuse truck of claim 21, wherein the operator monitoring system further comprises a resistor located at a connection between the operator sensor and the control module, the resistor configured to permit detection of a fault in the operator sensor.

26. A refuse truck comprising:
   a chassis supporting a truck body and an operator cab and being connected to a plurality of wheels;

a main brake operably connected to at least one of the wheels;

a parking brake operably connected to at least one of the wheels;

a transmission operably connected to transfer power to at least one of the wheels; and an operator monitoring system comprising:

an operator sensor configured to sense whether the operator is in a proper operating position within the operator cab; and a control module connected to the operator sensor and further connected to at least one of the main brake, the parking brake, and the transmission, wherein when the refuse truck is running and the operator sensor senses that the operator is not in the proper operating position, the control module is configured to activate safety features to stop the truck, including at least one selected from a group consisting of: activating the main brake, activating the parking brake, shifting the transmission to a different setting, and any combination thereof, wherein the operator monitoring system further comprises:

a first switch configured to be activated when the ignition of the truck is activated and the truck is in a right-hand drive configuration;

a second switch configured to be activated when a speed of the truck is within a threshold range;

a third switch configured to be activated when the operator sensor senses that the operator is not in the proper operating position;

a fourth switch configured to be activated when the parking brake is not engaged; and an activation switch within the control module that is configured to activate the safety features when the first, second, third, and fourth switches are all activated.

* * * * *